(12) United States Patent
Soh

(10) Patent No.: US 6,892,991 B1
(45) Date of Patent: May 17, 2005

(54) HEIGHT-ADJUSTABLE SUPPORT FOR ELEVATING FURNITURE

(76) Inventor: Sung Kuk Soh, 30003 Hickory La., Franklin, MI (US) 48025

( * ) Notice: Subject to any disclaimer, the term of this patent is extended or adjusted under 35 U.S.C. 154(b) by 0 days.

(21) Appl. No.: 10/797,337

(22) Filed: Mar. 10, 2004

Related U.S. Application Data

(60) Provisional application No. 60/442,997, filed on Mar. 11, 2003.

(51) Int. Cl.$^7$ ............................................. F16M 11/24
(52) U.S. Cl. ............................. 248/188.2; 248/222.52; 473/398; 16/32; 403/107
(58) Field of Search ........................... 248/188.2, 188.4, 248/188.5, 188.7, 188.8, 188.9, 407, 649, 248/222.52; 16/32; 5/11; 403/107, 108; 473/386, 473/396, 398

(56) References Cited

U.S. PATENT DOCUMENTS

| | | | | |
|---|---|---|---|---|
| 314,831 | A | * | 3/1885 | Hardy .......................... 248/161 |
| 878,043 | A | | 2/1908 | Chrisman |
| 1,394,631 | A | | 10/1921 | Luschka et al. |
| 1,670,601 | A | | 4/1926 | Weaver |
| 2,072,791 | A | | 3/1937 | Baer |
| 2,392,527 | A | | 1/1946 | Divil |
| 2,693,358 | A | * | 11/1954 | Dawson, Jr. ................. 473/398 |
| 2,893,164 | A | | 7/1959 | Martin |
| 2,919,514 | A | * | 1/1960 | King et al. ............... 248/188.9 |
| 2,933,850 | A | | 4/1960 | Martin |
| 3,469,870 | A | * | 9/1969 | Barkus ......................... 403/107 |
| 3,715,996 | A | * | 2/1973 | Rolfshus ....................... 297/311 |
| 3,795,925 | A | | 3/1974 | Leagus, Jr. |
| 3,870,268 | A | * | 3/1975 | Larkin ...................... 248/354.1 |
| 4,312,088 | A | | 1/1982 | Webb |
| 4,624,341 | A | * | 11/1986 | Lee .............................. 182/15 |
| 4,793,611 | A | * | 12/1988 | Thornell ...................... 473/483 |
| 4,948,207 | A | * | 8/1990 | Rolls et al. .................. 312/306 |
| 5,107,775 | A | | 4/1992 | Langlais et al. |

(Continued)

FOREIGN PATENT DOCUMENTS

JP      406245832 A  *  9/1994

*Primary Examiner*—Jon Szumny
(74) *Attorney, Agent, or Firm*—Carrier, Blackman & Associates, P.C.; Joseph P. Carrier; William D. Blackman

(57) ABSTRACT

An adjustable support apparatus, for elevating a furniture article, includes a base and a cradle which operatively engages the base so as to be supported thereby. The cradle includes a substantially horizontal support platform adapted to support a portion of a furniture item thereon. One of the base and the cradle has a plurality of projections extending outwardly thereon, and the other of the base and the cradle has a plurality of recesses, which mate with the projections when the base and the cradle are operatively engaged. The base and the cradle are rotatably adjustable relative to one another, to variously engage the projections and recesses and thereby establish multiple different height positions of the cradle support platform. The apparatus is used to adjustably raise the height level of a furniture article, particularly a bed, by placing individual supports according to the invention underneath the respective leg posts of the furniture article.

18 Claims, 14 Drawing Sheets

U.S. PATENT DOCUMENTS

| | | |
|---|---|---|
| 5,345,631 A | 9/1994 | Saperstein et al. |
| 5,599,258 A * | 2/1997 | Stone et al. ................ 482/52 |
| 5,615,429 A | 4/1997 | Williams |
| 5,885,174 A * | 3/1999 | Barnes ..................... 473/386 |
| 5,899,422 A | 5/1999 | Eke |
| 6,012,185 A | 1/2000 | Woods et al. |

* cited by examiner

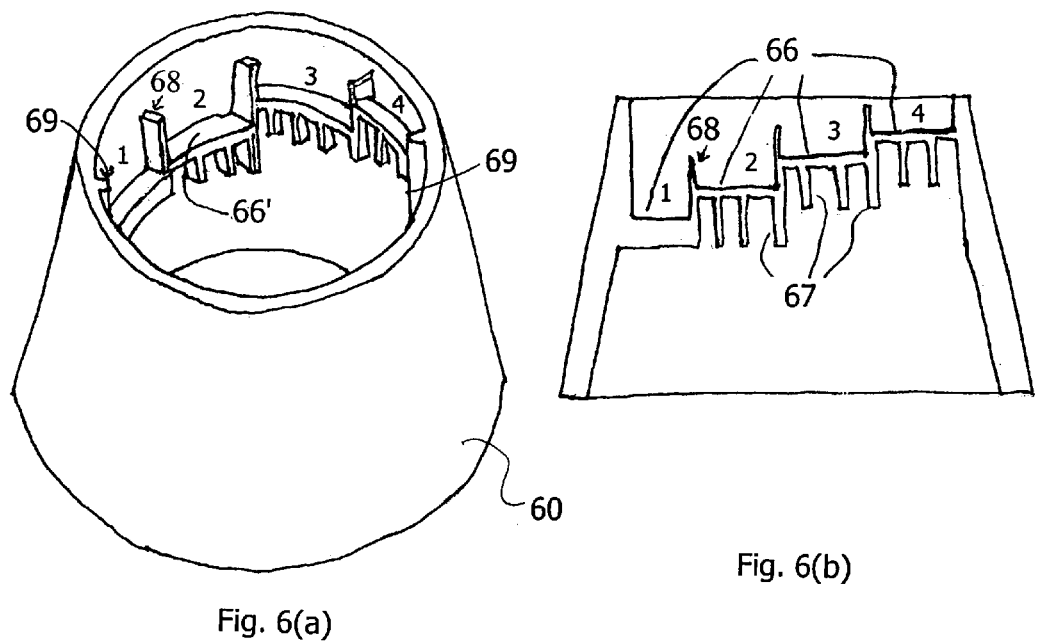
Fig. 6(a)
Fig. 6(b)
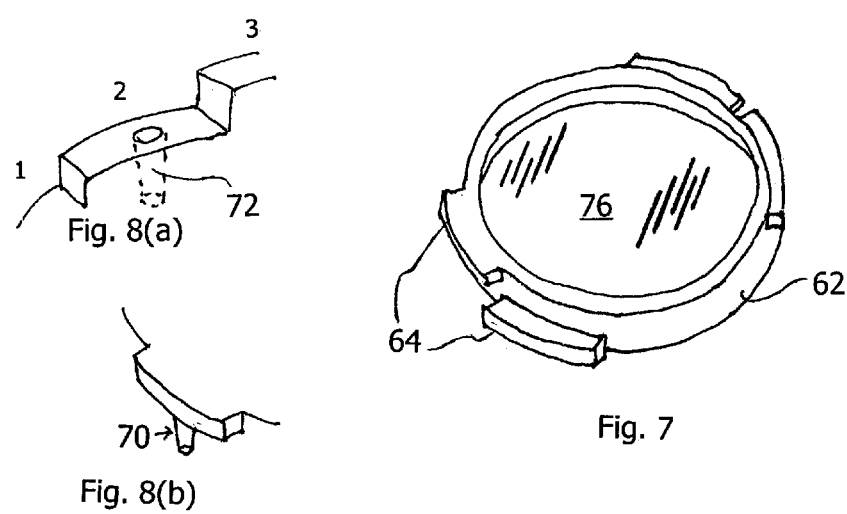
Fig. 8(a)
Fig. 8(b)
Fig. 7

A→E

A→J

140° approx

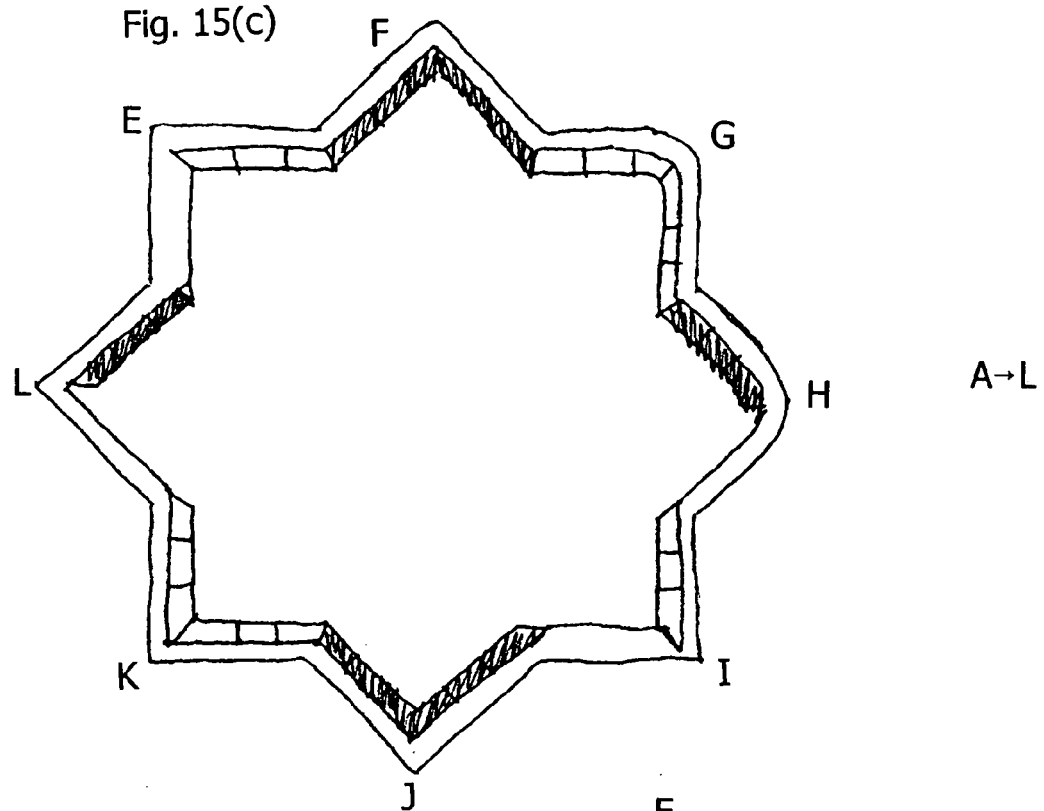
Fig. 15(c)  A→L
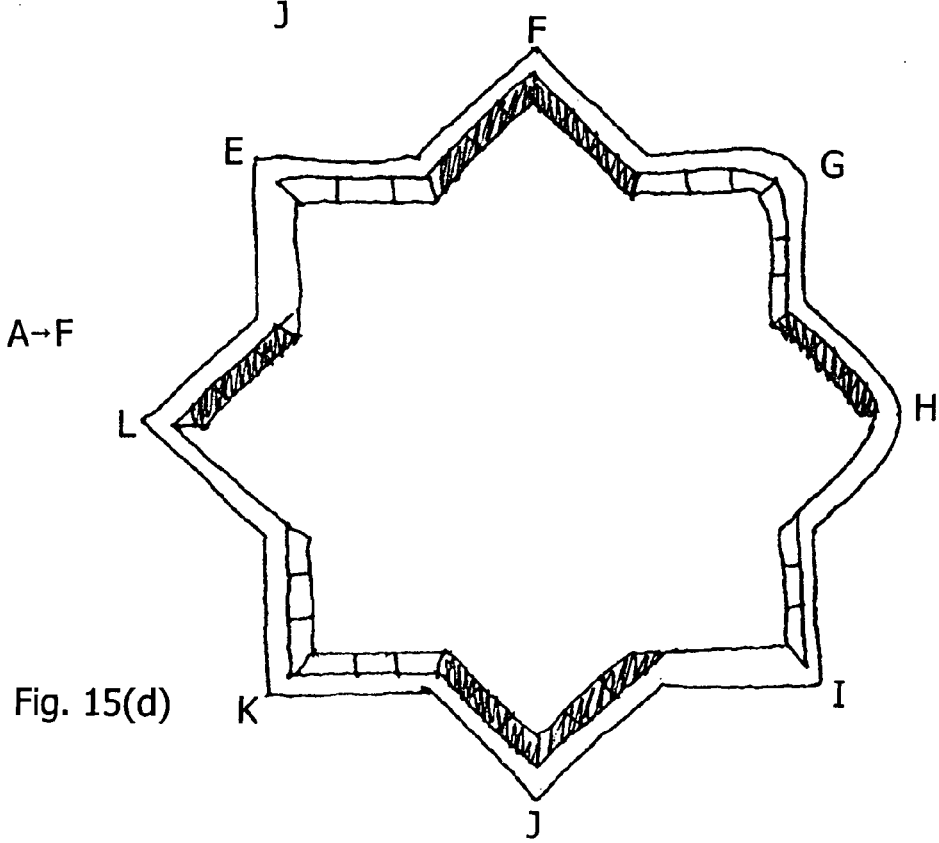
Fig. 15(d)  A→F

A→I

A→K

HEIGHT-ADJUSTABLE SUPPORT FOR ELEVATING FURNITURE

CROSS-REFERENCE TO RELATED APPLICATIONS

The present application claims priority under 35 USC 119 based on U.S. provisional application Ser. No. 60/442,997, filed Mar. 11, 2003. The disclosure of U.S. provisional application Ser. No. 60/442,997 is hereby incorporated by reference.

BACKGROUND OF THE INVENTION

1. Field of the Invention

The present invention relates to an adjustable support for use in elevating a bed or other furniture item above a floor surface or similar substrate, by placing the support underneath the leg(s) of the bed or other furniture item. More particularly, the invention relates to such a support having a simplified, low-cost structure which can easily be adjusted between multiple stepped positions, and which is capable of securely supporting a furniture item at a desired level during use.

2. Description of the Background Art

There are many known devices for raising the height level of a furniture item by positioning the devices such that the legs of the furniture item are supported above a floor surface by the devices. Many different designs of risers and furniture-elevating apparatus may be found in class 248, subclasses 188 et seq., and the known devices use various mechanisms for raising the height level of furniture above the floor.

Examples of some of the issued patents disclosing systems/device for raising the height level of furniture include U.S. Pat. Nos. 6,012,185, 5,899,422, 5,615,429, 5,345,631, 5,107,775, 4,312,088, 3,795,925, 2,072,791, and U.S. Pat. No. 1,670,601, some of which are discussed further below.

Eke, U.S. Pat. No. 5,899,422, issued May 4, 1999 and entitled "Adjustable Furniture Leg Extension", discloses a system in which a rotatable support member is received within a central opening of a base, via a screw thread connection, such that the height of the rotatable member relative to the base can be adjusted by rotating the support member. A locking mechanism, such as a thumbscrew, engages the support member to temporarily lock it in a desired position. The bottom surface of the base rests on the floor, while an elongated stabilizing member extends from the base to prevent the device from easily tipping during normal use.

Woods et al., U.S. Pat. No. 6,012,185, issued Jan. 11, 2000 and entitled "Blocks For Elevating Bed Legs", discloses a system in which a pair of stackable, nestable blocks are provide for elevating the legs of a bed. Each of the two blocks may be of a different height, so that each combination of one or both of the blocks produces a different elevation to which the bed may be lifted. Also, each of the blocks may have recesses in one or both ends of the block to receive and support the foot of the bed leg, and preferably, the depth of recesses in opposite ends of a block will be different, so that a given block may be used with either end facing upwards to achieve two different support orientations. One of the blocks is larger in size than the other such that the smaller block may be stacked/nested on top of the larger block. The disclosed configuration gives a total of five different elevations to which the bed may be raised.

Williams, U.S. Pat. No. 5,615,429, issued Apr. 1, 1997 and entitled "Bed Elevating Blocks", discloses a system for supporting the legs of a bed for the purpose of adjustably raising one end of the bed, including a number of stackable, molded blocks, whereby any number of the blocks may be stacked together in a nesting fashion to achieve a desired support height. A dimple is formed in the top of each block which may receive the bottom end of abed leg.

Langlais, U.S. Pat. No. 5,107,775, issued Apr. 28, 1992 and entitled "Adjustable Legs for Desk and the Like", discloses a support apparatus including an elongate sleeve, the upper end of which fits over the lower end of a furniture leg, and a bolt which may be selectively inserted through various vertically-spaced openings defined along the sleeve and functions as a stop for the end of the furniture leg. By placing the bolt in different openings the height by which the sleeve raises the furniture leg is varied.

Webb, U.S. Pat. No. 4,312,088, issued Jan. 26, 1982 and entitled "Portable Bed Adjusting Device For Patients And The Like", discloses a portable device for raising one end of a bed to a selected height, including male and female parts which are adjustable relative to each other via a screw thread therebetween, allowing for the height of elevation of the bed to be adjusted to the user's preference. A cavity is defined in the top member of the configuration such that a bed leg may be held stationary inside.

Leagus, Jr., U.S. Pat. No. 3,795,925, issued Mar. 12, 1974 and entitled "Bed Frame End Adjustable Height Stand", disclosed a bed elevating system which uses a self standing base having two axial uprights disposed vertically within the base. The upper terminal of the uprights has a notch, capable of supporting and seating a bed frame formed of angle iron or the like. An extension may be added to the upright which also has a notch in the upper terminal for supporting a bed frame. This extension allows the height of elevation of the bed to be anywhere from approximately 3 to 12 inches.

Baer, U.S. Pat. No. 2,072,791, issued Mar. 2, 1937 and entitled "Adjustable Combined Elevating and Supporting Device", discloses a support apparatus including a support base having an elongate tubular section and a support member also having an elongate tubular section which slidably and rotatably fits within the base tubular section and has a receiving cup that receives the bottom of a bed leg or the like. The base includes multiple engagement notches/openings defined along one portion thereof, while the support member has multiple projections extending from a portion thereof and which may be selectively engages in the notches/openings for establishing different heights of the support member above a floor surface.

As will be appreciated, each of such the known devices discussed above includes structure for adjusting its relative height/length, and hence the height to which the furniture is raised above a floor surface. Although the devices function appropriately for their intended uses, there are some drawbacks and disadvantages associated with the known devices. For example, several of the known devices are limited in their range of adjustability, being adjustable only between a small number of positions. Some of the previously known devices may become unstable during use, especially when set to a high level. Some of the known devices have a tendency not to stay in a desired position unless an additional locking mechanism is provided for such purpose. Some include a relatively large number of parts that must be connected together, especially at higher elevating positions. Some are relatively complicated and/or expensive to manufacture, some are relatively bulky, even when stored or shipped, etc.

Thus, a need still exists in the art for an improved adjustable support apparatus for raising the height of furniture above a floor surface, a device having a simple and economic construction, which is highly durable and stable during use, and permits a simple adjustment between several different positions.

SUMMARY OF THE INVENTION

The present invention provides an improved support apparatus for use in elevating a piece of furniture above a floor or other supportive substrate.

According to the present invention there is provided an adjustable support apparatus for use in elevating furniture, the apparatus comprising a base and a cradle, which operatively engages the base, so as to be supported thereby. The cradle includes a support platform adapted to support a leg of a furniture article thereon.

One of the base and the cradle has a plurality of projections provided therewith, and the other of the base and the cradle has a plurality of recesses which mate with the projections on the other component when the base and the cradle are operatively engaged. The base and the cradle are selectively rotatably adjustable relative to one another when no load is placed thereon, to variously engage the projections and recesses and thereby establish any one of a plurality of different available height positions of the cradle support platform.

Such a support apparatus according to the invention is advantageous because it is compact in size, includes only a small number of parts, and is simple to construct, assemble and use. The apparatus according to the invention is reliable, durable, and inexpensive to manufacture, and is versatile in adjustability between multiple different heights. Optionally, the apparatus may be adapted to automatically maintain a desired orientation during use with a special/dedicated locking mechanism.

The support platform of the cradle may be shaped to fit virtually any shape or size furniture item, such as a bed leg, and the base can have a floor surface engaging portion of various shapes and sizes for assuring appropriate stability of the device in any application.

The base and the cradle may each be molded as a unitary member of appropriate rigid and durable load-bearing material such as plastic, reinforced plastic, metal, a composite material such as disclosed in applicant's co-pending application U.S. Ser. No. 10/173,721, etc. Both the cradle and the base may be manufactured/molded from the same type of material.

The base may be shaped as a hollow truncated cone, with the recesses formed in an inner surface thereof, while the cradle may be a substantially cylindrical or disk shaped member with a smaller outer diameter than an inner, central opening of the base such that it may readily fit or insert into the base. Protruding from the outer surface of the cradle are the projections, which are, again, sized and shaped to mate with the recesses of the base, while the cradle includes a support platform (which may be formed at an end or intermediate portion thereof) that is shaped to receive and support the end of a bed leg, for example.

When the cradle is inserted into the base, the cradle projections are engaged with and supported by various ones of the recesses of the base. The cradle may be lifted up and rotated relative to the base to adjust the height of the cradle support platform, such that the projections engage those of the recesses which correspond to the desired height.

The use of a plurality of projections on the cradle for simultaneously engaging recesses of the base allows for an increase in stability and load-bearing. The cradle may also be invertible relative to the base, i.e., it can be used in an upright orientation or in an upside down orientation such that the supporting surface would be at a different height, depending on the orientation of the cradle. This invertible aspect of the cradle establishes two different heights at which the cradle may be supported, relative to one set of recesses.

For shipping and storage purposes the cradle may be nested within the base, and similarly a plurality of bases and/or cradles may be compactly nested together.

Further, the recesses of the base may extend horizontally, vertically or diagonally, depending on what is desired. If the recesses are aligned vertically or diagonally, the weight of a supported object would tend to maintain a set orientation of the cradle relative to the base during use. Also, the projections may be spaced in multiple dimensions from each other, e.g., vertically and horizontally, for achieving an enhanced degree of support strength and stability during use.

Other objects, advantages and salient features of the invention will become apparent from the following detailed description which, when read in conjunction with the annexed drawings, discloses the present embodiments of the invention.

BRIEF DESCRIPTION OF THE DRAWINGS

FIG. 1(*b*) is a cross-sectional view of the height-adjustable support of FIG. 1(*a*), with the components thereof rearranged, to provide a relatively greater height;

FIG. 2(*b*) is a central cross-sectional view of the cradle of FIG. 1(*a*), taken along a line extending between an opposing pair of projections;

FIG. 3(*b*) is a central cross-sectional view of the base of FIG. 3(*a*);

FIG. 3(*c*) is a view similar to FIG. 3(*b*), showing an alternative shape for the grooves formed in the base;

FIG. 4(*b*) is a cross-sectional view of the modified embodiment of FIG. 4(*a*) with the portions of the base connected together and the cradle supported on the base in an elevated orientation similar to FIG. 1(*b*);

FIG. 5(*b*) is a perspective view of the base according to a second embodiment of the height-adjustable support of the present invention;

FIG. 6(*a*) is a perspective view of the base according to a third embodiment of the height-adjustable support of the present invention;

FIG. 6(*b*) is a central cross-sectional view of the base according to the third embodiment of the height-adjustable support of the present invention;

FIG. 7 is a perspective view of a cradle according to the third embodiment of the height-adjustable support of the present invention;

FIG. 8(a) is a perspective view of a portion of the base according to a modification of the third embodiment of the height-adjustable support;

FIG. 8(b) is a perspective view of a portion of the cradle according to the modification of the third embodiment of the height-adjustable support;

FIGS. 15(a) through 15(f) are horizontal cross-sectional views showing different ways of arranging the cradle on the base in the fifth embodiment hereof.

DETAILED DESCRIPTION

Figure 1A:
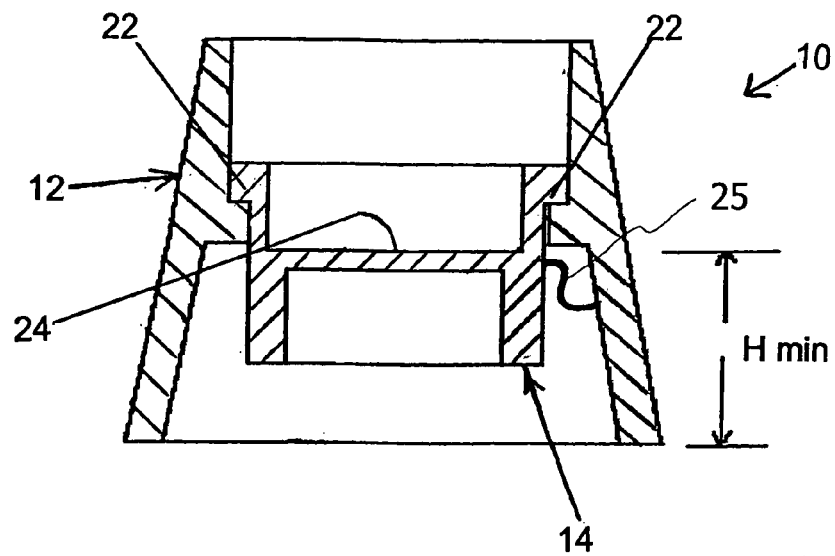
FIG. 1(*a*) is a cross-sectional view of a height-adjustable support apparatus according to a first embodiment of the present invention, with components thereof in a first, compact arrangement to provide a relatively low height.
Figure 1B:
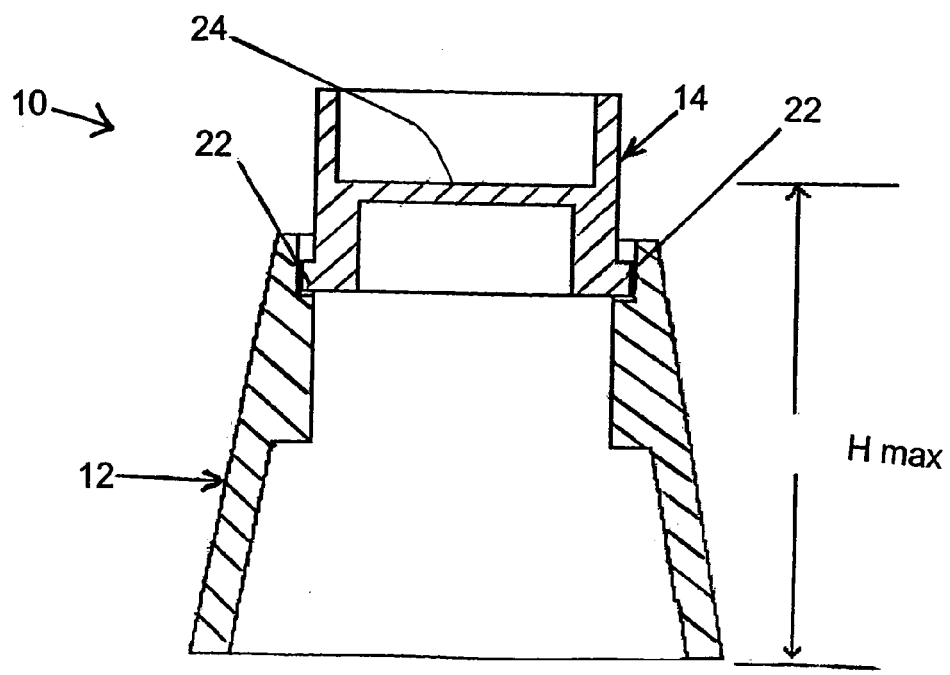

First Embodiment—Overview Referring to FIGS. 1(a)–1(b), a height-adjustable support apparatus, according to a first embodiment of the present invention, is shown generally at 10. The support apparatus 10 generally includes a base 12 which is provided to rests on a floor surface or similar substrate (e.g., a floor, a counter top, a table, etc.), and a cradle 14, which may be selectively and adjustably engaged with, and supported by the base 12 in various orientations and arrangements corresponding to different heights of a support platform 24.

In this first embodiment of the apparatus 10, the base 12 has a number of substantially vertical grooves 20 (FIGS. 3a, 3b) defined in an inner surface thereof to receive cradle projections. Correspondingly, the cradle 14 has a number of projections 22 extending outwardly thereon, which are provided to fit in and operatively engage the grooves.

The cradle 14 also includes a generally flattened, substantially horizontal integral support platform 24 extending thereacross, which is provided to receive and support a selected portion of an article of furniture, such as for example, a leg post of a bed or dresser.

A rubber band or other simple elastic member is indicated at 25 in FIG. 1(a), which band may, optionally, be used to attach the cradle 14 and base 12 together, while otherwise being very stretchable to permit the two parts to be manipulated, relative to each other, into various height orientations as discussed further below.

Each of the base 12 and cradle 14 are further described below, with reference to FIGS. 2(a)–3(b).

The Base

Figure 3A:
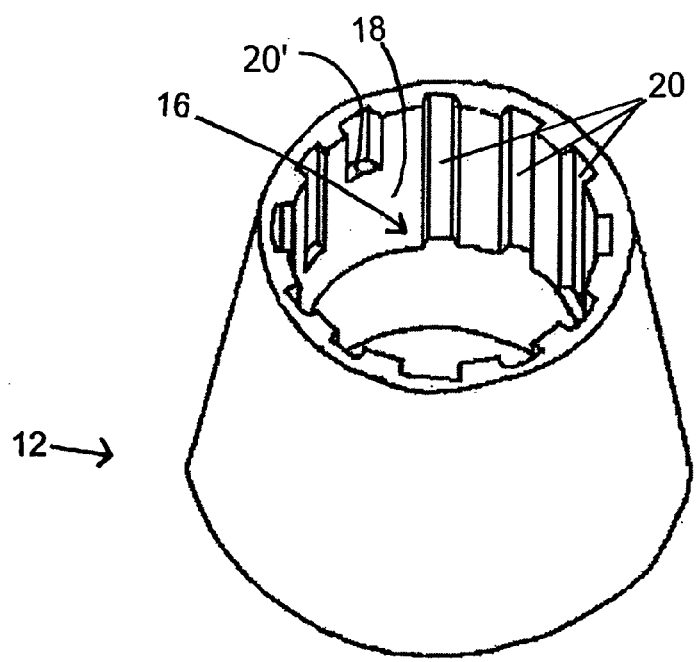
FIG. 3(*a*) is a perspective view of the base of FIG. 1(*a*)
Figure 3B:
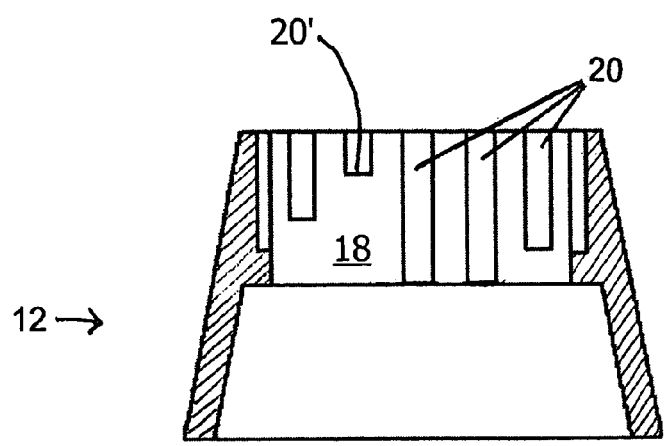

Referring to FIGS. 3(a)–3(b), the base 12 may be formed as a hollow member having a large central opening 16 formed therein, for receiving the cradle 14. The base 12 is open at the upper end thereof, and may have a truncated conical outer shape, as depicted. The inner surface 18 of an upper portion of the base may be substantially cylindrical in shape, with a diameter slightly greater than the outer diameter of the cradle 14, and with a plurality of the substantially vertical grooves 20 defined therein. The lower portion of the base may have an inner surface that extends substantially parallel to the outer surface, as shown in FIG. 3(b).

In the first embodiment hereof, the inner surface 18 of the base upper portion has a plurality of variously shaped grooves 20 defined therein, as noted. Each groove 20 includes a substantially horizontal floor portion or foothold 20', and the footholds of adjacent grooves are located at different heights from one another. The footholds 20' are provided to engage and support the projections 22 of the cradle 14.

Some of the grooves 20 extend the full depth of the upper portion of the base, while other grooves extend to different graduated depths, starting from the upper edge of the base. Opposing grooves facing each other at 180 degrees across the base extend to the same depth, as shown, for thereby supporting a pair of the projections which are correspondingly located at the same height as one another.

The depicted structure and shape of the base is advantageous in terms of stability during use, as well as compact nesting during storage and transportation, as discussed further below.

Other than the truncated, conical shape depicted, the base 12 may be of any shape or size, so long as the shape of the inner surface 18 of the base 12 and the grooves 20 defined therein correspond to the shape of the cradle 14 and the projections 22. For example, the base may be of a pyramidal, cubic or prism outer shape, while the inner surface 18 of the base would still correspond to the outer shape of the cradle 14. The base 12 is designed so as to rest on a surface which is substantially flat, i.e. a floor, a counter top, etc. For increased stability, the diameter of the lower end of the base 12 may be increased, a flange (not shown) may be provided around the lower edge of the base, etc.

Figure 3C:
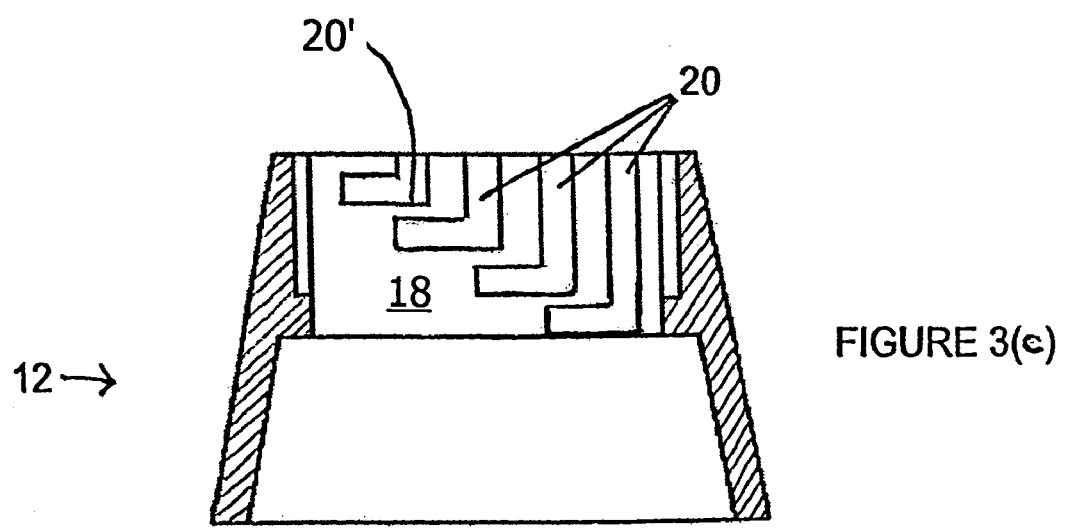

FIG. 3(c) illustrates an optional modification of the base of FIG. 3(b), in which the grooves are formed substantially in an L-shape, in order to allow the cradle to be vertically inserted therein and lowered to contact the floor portion thereof, and then rotated to temporarily and disengageably lock the cradle in place at a selected level with respect to the base.

The Cradle

Figure 2A:
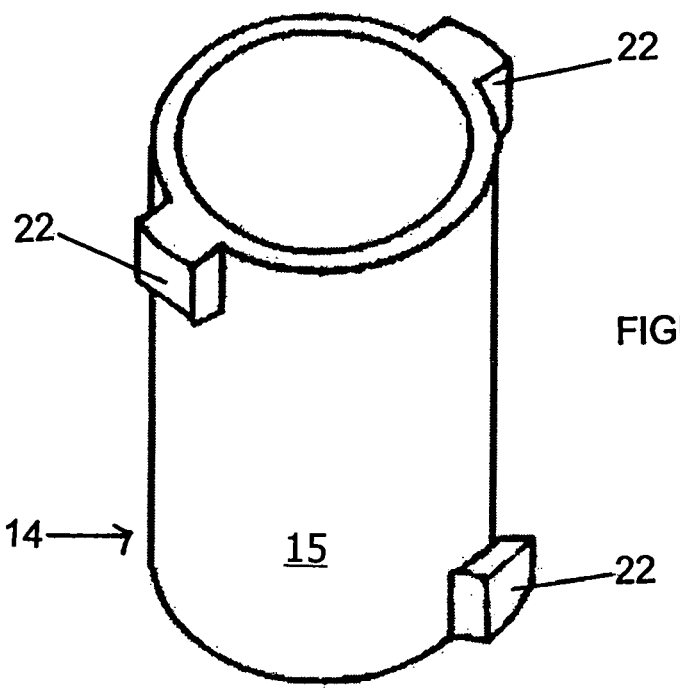
FIG. 2(*a*) is a perspective view of the cradle of FIG. 1(*a*)
Figure 2B:
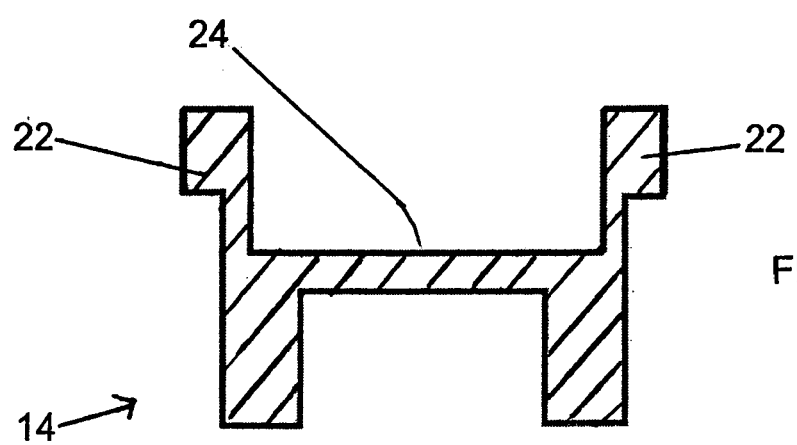

The cradle 14, shown by itself in FIGS. 2(a) and 2(b), includes a cradle body 15 which may be substantially cylindrically shaped, and which has the projections 22 extending outwardly from the outer circumferential surface thereof at or near opposite ends thereof.

The cradle is configured to fit into the central opening 16 extending through the base 12, as previously noted. The projections 22 are designed so as to operatively engage with, and be supported by the various different grooves 20 of the base 12, for establishing various heights of the cradle support platform 24, such as shown in FIGS. 1(a) and 1(b). The projections 22 may be of incrementally smaller width and horizontal depth than the grooves 20, and may be somewhat elongate and tapered, so as to allow for a stable engagement between the projections and grooves.

The projections 22 may be provided in pairs, as shown, or in other spaced multiples, where pairs of projections are located diametrically across the cradle from each other, or the multiples are spaced equally around the circumference of the cradle. It will be understood that the number and spacing of the grooves 20, in the base 12, will correspond to the number and spacing of the projections 22.

A pair of the projections 22 may be formed at each of the opposite ends of the cradle 14, as shown. The projections may be formed at intermediate portions of the cradle 14, rather than at the ends thereof.

The support platform 24 may be recessed to an intermediate level within the cradle, as shown, and may have different shapes and/or sizes on opposite sides thereof. With such structure, the opposite sides of the support platform may be selectively arranged to support different size leg posts or the like, by simply orienting the cradle 14 in one direction or the other when engaged in the base. The size and shape of the recessed support platform 24 may correspond to the size and shape of the leg post, whereby the leg post is securely retained by the support platform, which ensures greater stability of the support apparatus 10 during use. Although the support platform 24 is depicted at approximately the vertical center of the cradle 14, the platform could be disposed closer to one end of the cradle, or two separate support platforms could be provided, associated with respective ends of the cradle.

Again with reference to FIGS. 1(a) and 1(b), a second aspect of the height adjustability of the support apparatus (apart from the aspect involving use of different ones of the grooves 20) is achieved by engaging different pairs of the projections 22 in a given pair of the grooves.

Specifically, with the cradle in one orientation thereof, the pair of projections 22 on the upper end of the cradle may be engaged with a pair of grooves 20 for establishing a relatively low height of the support platform as shown in FIG. 1(a).

Alternatively, the cradle may be inverted, and a pair of projections 22 on the lower end of the cradle may be engaged with the same pair of grooves 20 for establishing a relatively high height of the support platform, as shown in FIG. 1(b). The cradle 14 may be fully disposed within the base in the lower position, and may project upwardly from the base in the higher position, as shown.

The base 12 and the cradle 14 may each be molded as a unitary member of appropriate rigid and durable material such as plastic, reinforced plastic, metal a composite material such as disclosed in applicant's co-pending application U.S. Ser. No. 10/173,721, etc. Both the cradle and the base may be manufactured/molded from the same type of material. The entire disclosure of co-pending application U.S. Ser. No. 10/173,721 is incorporated herein by reference.

In assembling the support apparatus 10, the cradle 14 is simply inserted into the central opening 16 of the base 12, with the desired side of the cradle facing upwardly, and such that a pair of the projections 22 engage a desired pair of the grooves 20 corresponding to a desired support height.

If the desired projections that are to engage the grooves are on the upper portion of the cradle, such as in FIG. 1(a), the projections on the lower portion of the cradle would be aligned with grooves 20 that extend the full length of the base upper portion when the cradle is initially inserted, so that the lower projections pass completely through the upper portion of the base and are then disposed within the lower portion of the base.

To select a different support height for the support platform 24, the cradle 14 is simply raised relative to the base to disengage the projections from the grooves. Then, the cradle is rotated relative to the base until the projections are aligned with the newly selected grooves, and then the cradle is again lowered to engage the projections with the desired grooves, and to rest the projections 22 on the horizontal footholds 20' of the new grooves.

The depicted structures of the base and cradle in the first embodiment desirably permit the support apparatus 10 to be compactly arranged or nested by itself or with multiple other such devices 10 for storage and shipping. Accordingly, the cradle 14 may be fully disposed within the base 12 as shown in FIG. 1(a), and a plurality of the devices 10 arranged as in FIG. 1(a) may be nested together, because the upper portion of the base 12 fits snugly within the hollow of the lower portion of another base such that a cradle 14 is sandwiched between the two bases.

Modified Version of the First Embodiment

Figure 4A:
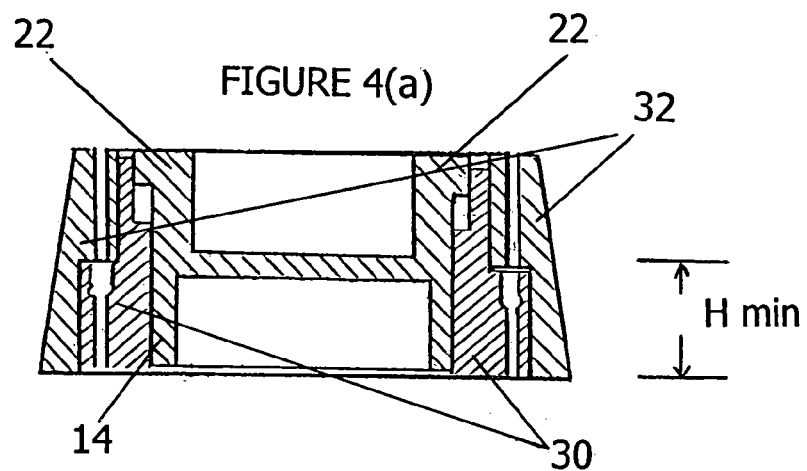
FIG. 4(*a*) is a cross-sectional view of a modification of the first embodiment of the height-adjustable support in a collapsed storage position wherein the base is constructed as two pieces which may be connected together with fasteners.
Figure 4B:
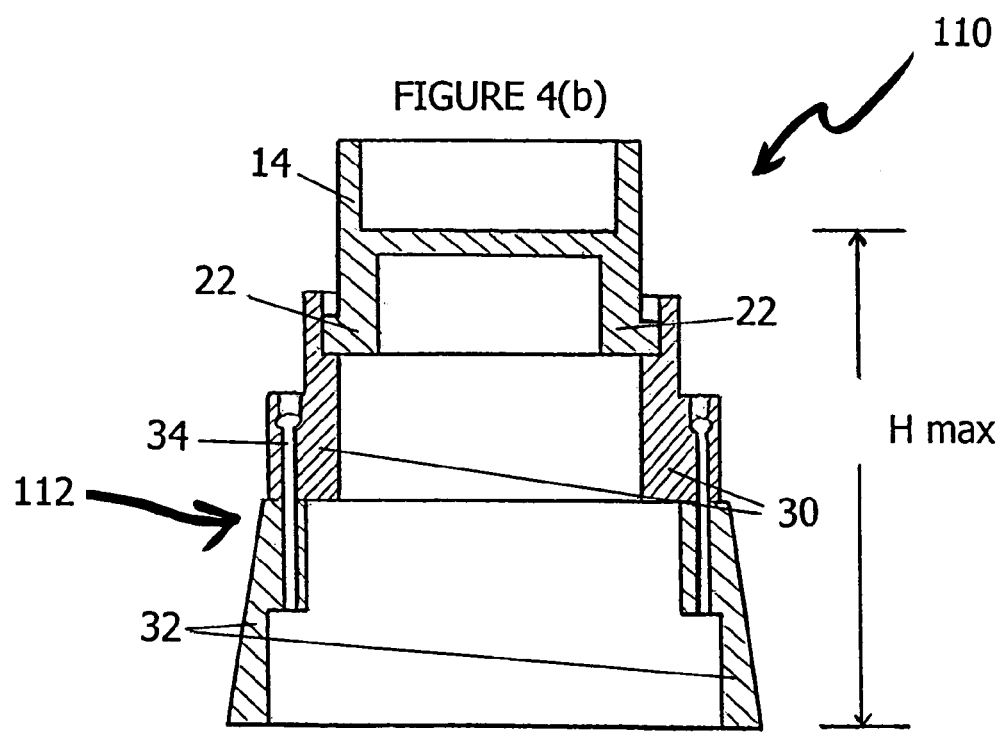

In order to increase the compactness and nestability of the support apparatus 110 (FIG. 4(a)) for storage and transportation, and also to lower the minimum height, the base 112 may be formed of a plurality of component pieces that can be selectively connected together with appropriate fastener(s) or disassembled, such as in the modified version of the first embodiment depicted in FIGS. 4(a) and 4(b). The apparatus 110 in the modified embodiment of FIGS. 4(a)–4(b) functions in substantially the same manner as the first embodiment.

In this modified embodiment, as depicted, the base 112 includes first (upper) and second (lower) base portions 30, 32, respectively, and a pair of fasteners 34, e.g., screws, which can connect the first and second base portions 30, 32 together into an extended operative shape shown in FIG. 4(b), similar to the base 12 of the first embodiment.

Alternatively, the first and second base portions 30, 32 may be assembled into a compact storage shape shown in FIG. 4(a).

In this modified embodiment of the support apparatus 110, the cradle 14 is the same as in the above-described first embodiment, and the components would be formed of materials such as discussed in relation to the first embodiment.

The inner surfaces of the first and second base portions 30, 32 are both stepped, with openings formed axially through the stepped flange portions thereof, for receiving the screws 34. The first portion 30 of the base 112 has grooves formed in the inner peripheral surface thereof, similar to the grooves 20 described herein in connection with the first embodiment.

In the high operative position, the first base portion 30 is secured on the upper surface of the second base portion 32. Conversely, in the low operative position and in the storage position of the apparatus 110, the first base portion 30 is closely disposed within a hollow space defined within the portion 32, and the cradle 14 is disposed within a hollow space inside the portion 30.

Second Embodiment

Overview

Figure 5A:
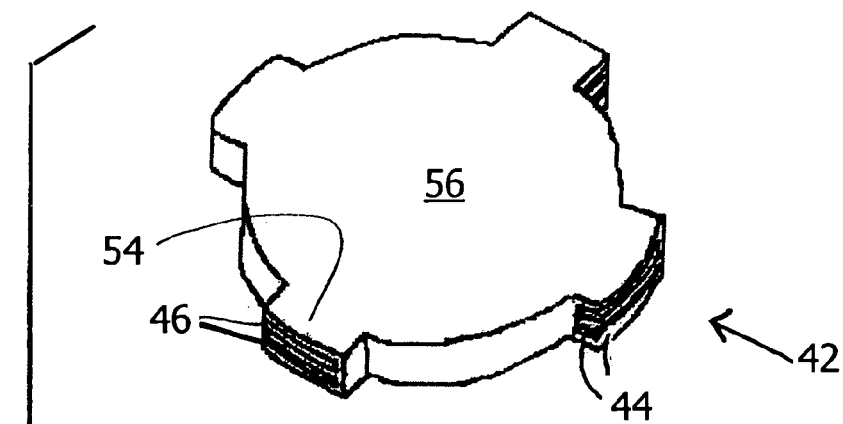
FIG. 5(*a*) is a perspective view of a cradle according to a second embodiment of the height-adjustable support of the present invention.
Figure 5B:
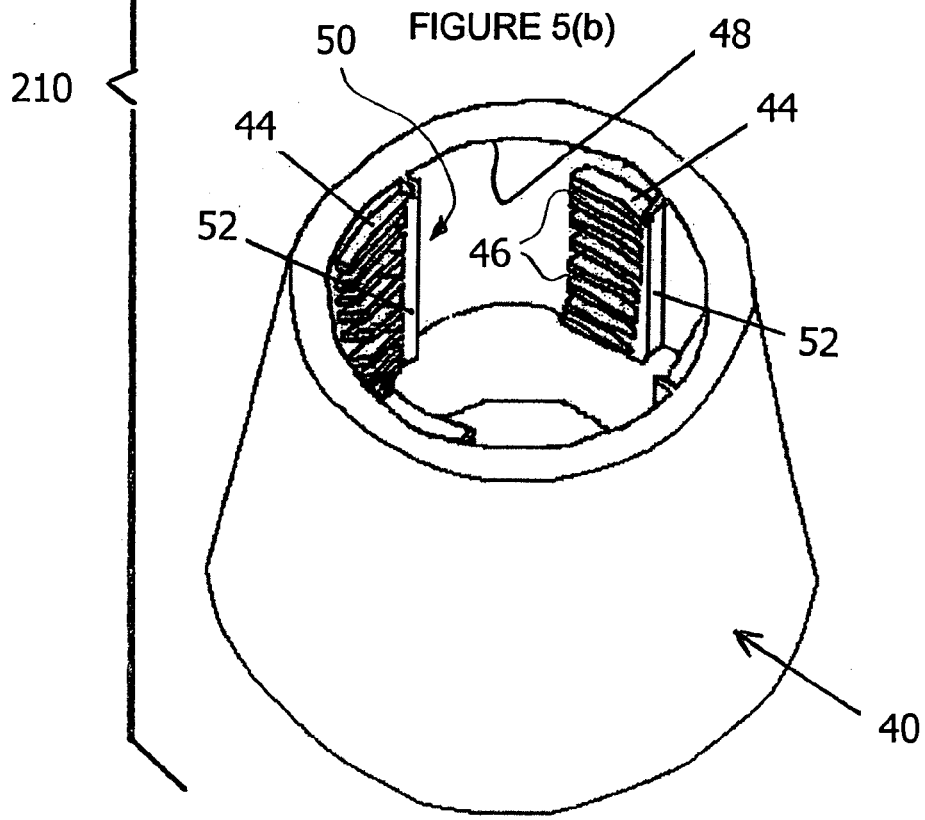

According to a second embodiment of the invention, as seen in FIGS. 5(a) and 5(b), a support apparatus 210 again includes two parts formed of appropriate material, i.e., a base 40 and a cradle 42, which may be selectively, operatively engaged with the base in various positions corresponding to different support heights. As depicted, the cradle 42 may be a substantially flat member, while both the cradle and the base 40 may have substantially horizontally aligned projections 44 and grooves 46 provided therewith and which are adapted to be engaged with the projections and grooves on the other part. Although not shown, a rubber band or other elastic member, such as the member 25 in the first embodiment, could be used to join the cradle 42 and the base 40 together.

The Base

Particularly, the base 40 (again) may be formed as a hollow member having a large central opening 48 for receiving the cradle 42, and a truncated conical outer shape. The inner surface of an upper portion of the base 40 may (again) be substantially cylindrical in shape with a diameter slightly greater than the outer diameter of the cradle 42, with a plurality of the projections 44 and grooves 46 defined thereon in an alternating pattern and in a plurality (four are depicted) of vertically extending columns 50 equally spaced therearound. At one edge of each column 50 a vertical stop rib 52 may be provided, to limit a maximum degree of rotation of a cradle 42 engaged with the base. The lower portion of the base may (again) have an inner surface that extends parallel to the outer surface, as shown.

The Cradle

On its outer peripheral surface, the cradle 42 may include a plurality (again four are depicted) of vertically extending groups 54 of the projections 44 and grooves 46 arranged in an alternating manner, and which may be selectively operatively engaged with various projections and recesses in the columns 50 of the base for establishing different heights of the cradle 42 relative to the base 40. One edge of each group 54 is also closed as depicted, again, to limit the maximum degree of rotation of the cradle 42 relative to the base 40. The upper surface of the cradle 42 functions as a support platform 56 for a furniture leg post or the like.

In use, the cradle 42 is aligned with base such that the groups 54 extend between the columns 50, and then the cradle is moved vertically to a desired level and then rotated clockwise relative to the base, to operatively engage the respective projections 44 and grooves 46 on the two parts. When it is desired to adjust the position of the cradle, it is rotated counter clockwise relative to the base to disengage the two parts, and the cradle is then moved to a desired level, and again rotated clockwise to engage the projections and recesses of the two parts.

As will be appreciated, in this embodiment there is a larger support surface area engaged between the several projections 44 and the recesses 46 of the cradle and corresponding projections 44 and recesses 46 of the base, as compared to the first embodiment, for greater support strength. Also, the projections 44 and the recesses 46 have a smaller width than those of the first embodiment, allowing for finer height adjustments. Still further, the thinner dimensions of the projections 44 and recesses 46 may lower manufacturing costs as the thicker sections require longer molding cycle time when molding the parts from plastic.

Although the cradle 42 of this embodiment is depicted as a substantially flat member, it may instead be structured similar to the cradle of the first embodiment, e.g., a substantially cylindrical member with the groups 54 of projections and recesses provided at opposite ends, and with the support platform 56 disposed at an intermediate portion of the cradle and differently shaped opposite surfaces for supporting differently shaped objects.

Further, different numbers of the columns 50 and groups 54 may be provided other than the number (four) depicted. Still further, the projections 44 and recesses could extend other than horizontally, e.g., at an angle somewhere between horizontal and vertical. Such an orientation is advantageous in that when weight is applied to the cradle 42 during use, the angled orientation helps to prevent the accidental loosening or unlocking of the assembly. Optionally, a locking mechanism (not shown), e.g., a thumb screw, may be provided to secure the cradle and base in a desired orientation during use.

As with the first embodiment, the base 40 may consist of multiple pieces able to be embedded within each other for storage/transportation purposes, etc. Further, in both embodiments, both the cradle and the base may be made out of a rigid, yet durable material, such as a fiber reinforces plastic, fiberglass, or a material such as that disclosed in applicant's U.S. patent application Ser. No. 10/173,721, which is hereby incorporated by reference within this text. The material should be such that the components will be reliable for use for an extensive period of time.

Third Embodiment—Overview

According to a third embodiment of the invention, as seen in FIGS. 6(a)-7, a support apparatus again includes two parts, i.e., a base 60 and a cradle 62 which may be selectively, operatively engaged with the base in various positions corresponding to different support heights.

The third embodiment includes features and functions similar to those of the first two embodiments. As depicted, the cradle 62 may be a substantially flat member, with pairs of substantially horizontally extending projections 64 that are slightly offset relative to each other in both circumferential and vertical directions (a so-called bi-wing arrangement), and a support platform 76. During use, both pairs of the projections 64 engage adjacent levels of groove footholds 66' to strongly support the cradle thereon.

The support platform 76, as depicted, is somewhat recessed on its upper face, while its lower face would be similarly recessed but with a different size and/or shape for accommodating different sized furniture leg posts, similar to the support platform 24 of the first embodiment. Again, while the cradle 62 has a relatively small height as depicted, it could be modified to have a greater height, and to include pairs of the projections 64 on opposite ends thereof, similar to the cradle 14 of the first embodiment.

The Base

The base 60 (again) may be formed as a hollow member having a large central opening for receiving the cradle 62, and a truncated conical outer shape. The inner surface of an upper portion of the base 60 may (again) be substantially cylindrical in shape with a diameter slightly greater than the outer diameter of the cradle 62, with a plurality of vertically aligned grooves 66 defined thereon and spaced completely therearound. As depicted, eight of the grooves 66 are provided in two symmetrical sets of four, on opposite halves of the base inner surface, the grooves extend to different depths on the inner surface in a stepped manner relative to each other. Separating adjacent ones of the footholds 66' are vertically extending keys 68, which maintain the cradle in a set position during use. The width of each groove 66 is incrementally greater than that of each projection 64, whereby each projection 66 is snugly engaged by two of the keys 68 on opposite sides thereof during use. Although not shown, small transverse lateral projections could be provided on surfaces of the keys 68, as a snap-fit feature.

The grooves 66 are different than the vertical grooves 20 of the first embodiment in that the grooves 66 are wider, all have footholds 66', they project from the inner peripheral surface rather than being formed into the surface, and have reinforcing ribs 67 provided below the footholds 66'. Indicated at 69 are extended height stoppers, which separate the opposing sets of grooves 66 on the inner surface of the base. The stoppers 69 extend completely up to the top edge of the base, unlike the keys 68, and limit the extent to which the cradle may be rotated when inserted in the base.

The Cradle

In use, the cradle would be inserted into the base so that the two pairs of projections 64 engage two adjacent pairs of the grooves 66, whereby the cradle may be selectively disposed in any of three different heights. Of course, a greater or lesser number of the grooves 66 could be provided and/or only a single pair of the projections 64 could be provided on the cradle 62 for varying the number of height adjustments available with the support apparatus.

A main advantage of the third embodiment its increased support area achieved by using two or more height levels simultaneously, increasing the load bearing ability and stability.

As will be understood, the cradle 62 and base 60 of the third embodiment would be molded of appropriate materials such as discussed above, may be modified in various ways such as discussed above in relation to the first and second embodiments.

With reference to FIGS. 8(a)–8(b), there is shown a modification of the support apparatus according to the third embodiment. Particularly, the keys 68 are replaced with posts 70 provided on the lower surface of one or more of the projections 66, and mating holes 72 provided in the footholds 66' to receive the respective posts 70.

Fourth Embodiment

According to a fourth embodiment of the invention, as seen in FIGS. 9(a)-11, a support apparatus again includes two parts, i.e., a base 80 and a cradle 82 which may be selectively, operatively engaged with the base in various positions corresponding to different support heights.

The fourth embodiment includes features and functions similar to those of the first embodiment. As depicted, the cradle 82 may be a substantially cylindrical member, with a pair of elongate, substantially vertically extending projections 84 on opposite sides thereof, that are tapered wider to narrower from top to bottom, and a recessed support platform 88 for receiving a furniture leg post or the like. Also, a flange 90 is provided at the upper end of the cradle in surrounding relation to the support platform 88, and includes indicia or other appropriate markings corresponding to the different support heights to which the cradle may be adjusted relative to the base 80. In this embodiment, the cradle may not be disposed in an opposite or upside down orientation relative to the base given the shape of the projections 86 and the presence of the flange 90. Of course, the cradle could be modified to be reversible, as with the other embodiments.

The base 80 (again) may be formed as a hollow member having a large central opening for receiving the cradle 82, and a truncated conical outer shape. The entire inner surface of the base 80 may be substantially cylindrical in shape with a diameter slightly greater than the outer diameter of the cradle 82, with a plurality of vertically aligned and tapered grooves 86 defined therein, spaced completely there around, and shaped to snugly receive the projections 64 of the cradle therein.

Figure 9A:
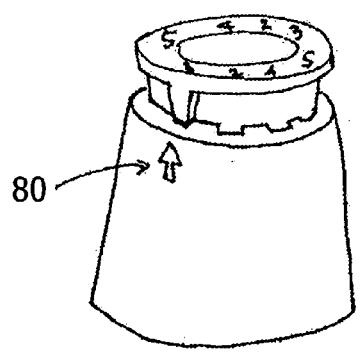
FIG. 9(a) is a perspective view of a height-adjustable support apparatus according to a fourth embodiment of the invention.
Figure 11:
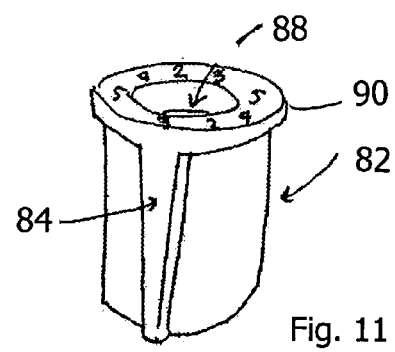
FIG. 11 is a perspective view of the cradle according to the fourth embodiment.
Figure 10:
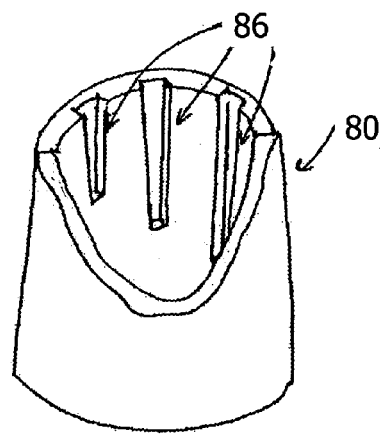
FIG. 10 is a perspective view, partially cut away, of the base according to the fourth embodiment.
Figure 9B:
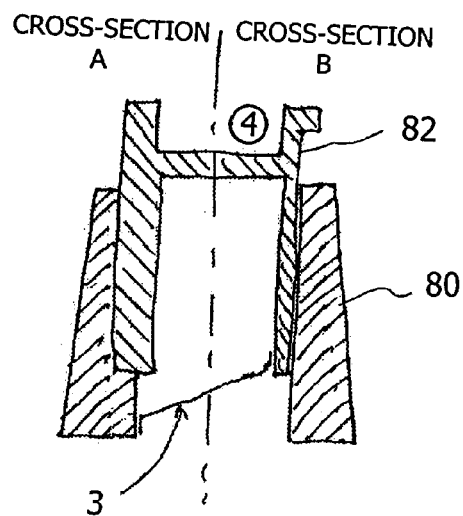
FIG. 9(b) is a cross sectional view of the support of FIG. 9(a), with the left half of the view extending through a projection on the cradle and the right half of the view offset from the left half and extending through a portion of the cradle without a projection.

As depicted, ten of the grooves 86 are provided in two symmetrical sets of five, on opposite halves of the base inner surface, and the grooves extend to different depths on the inner surface such that the cradle may be disposed in five different heights relative to the base by engaging the pair of projections 84 with different pairs of the grooves 86. As shown in the left half of FIG. 9(b), the groove 86 extending to the lowest level is still spaced above the bottom of the base 80, while as indicated in FIG. 9(a) the cradle projects above the base to varying degrees when engaged to the base.

As will be understood, the cradle 82 and base 80 of the fourth embodiment would be molded of appropriate materials such as discussed above, may be modified in various ways such as discussed above in relation to the first–third embodiments.

Fifth Embodiment—Overview

Figure 12:
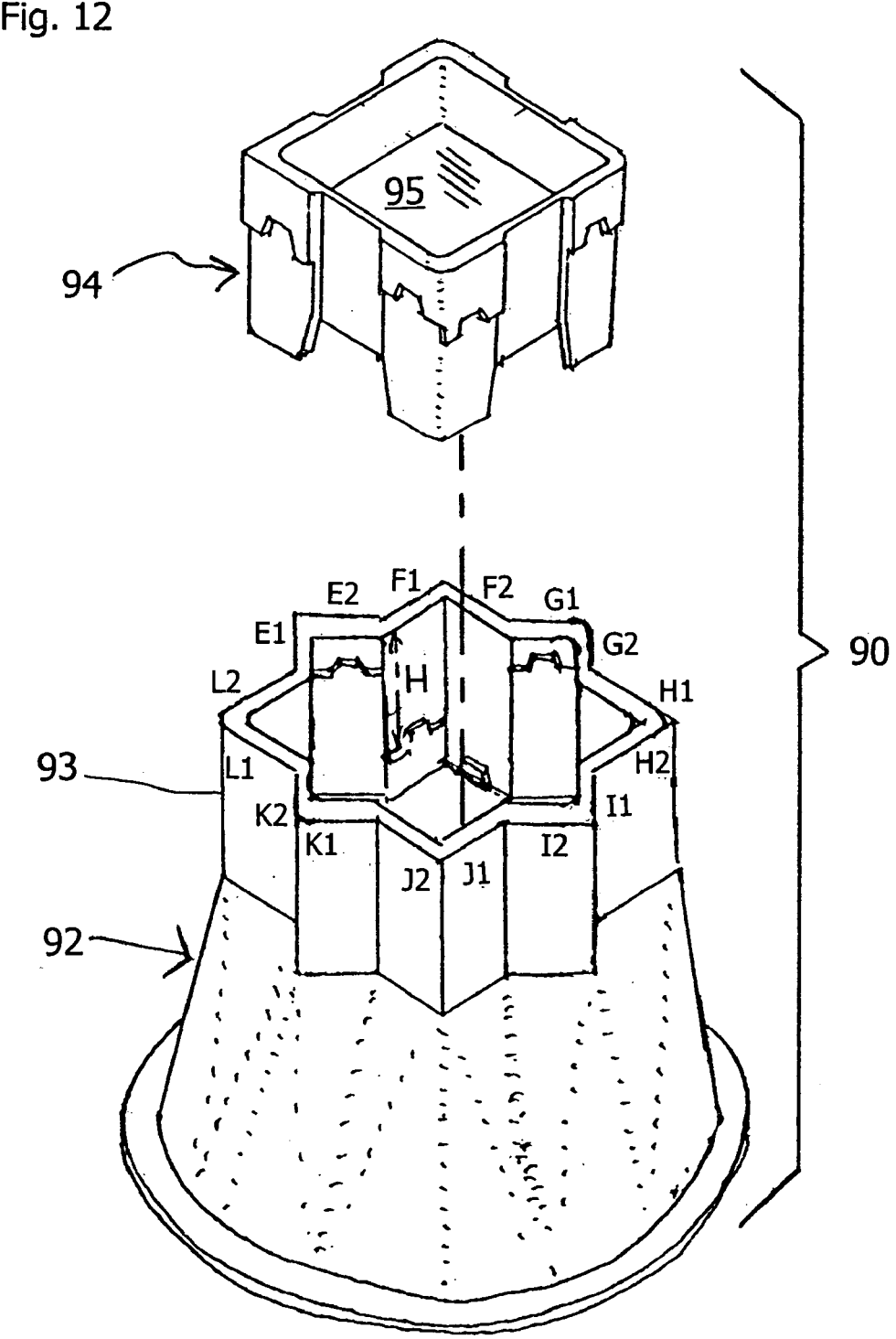
FIG. 12 is an exploded perspective view of a support apparatus according to a fifth embodiment of the present invention.
Figure 13:
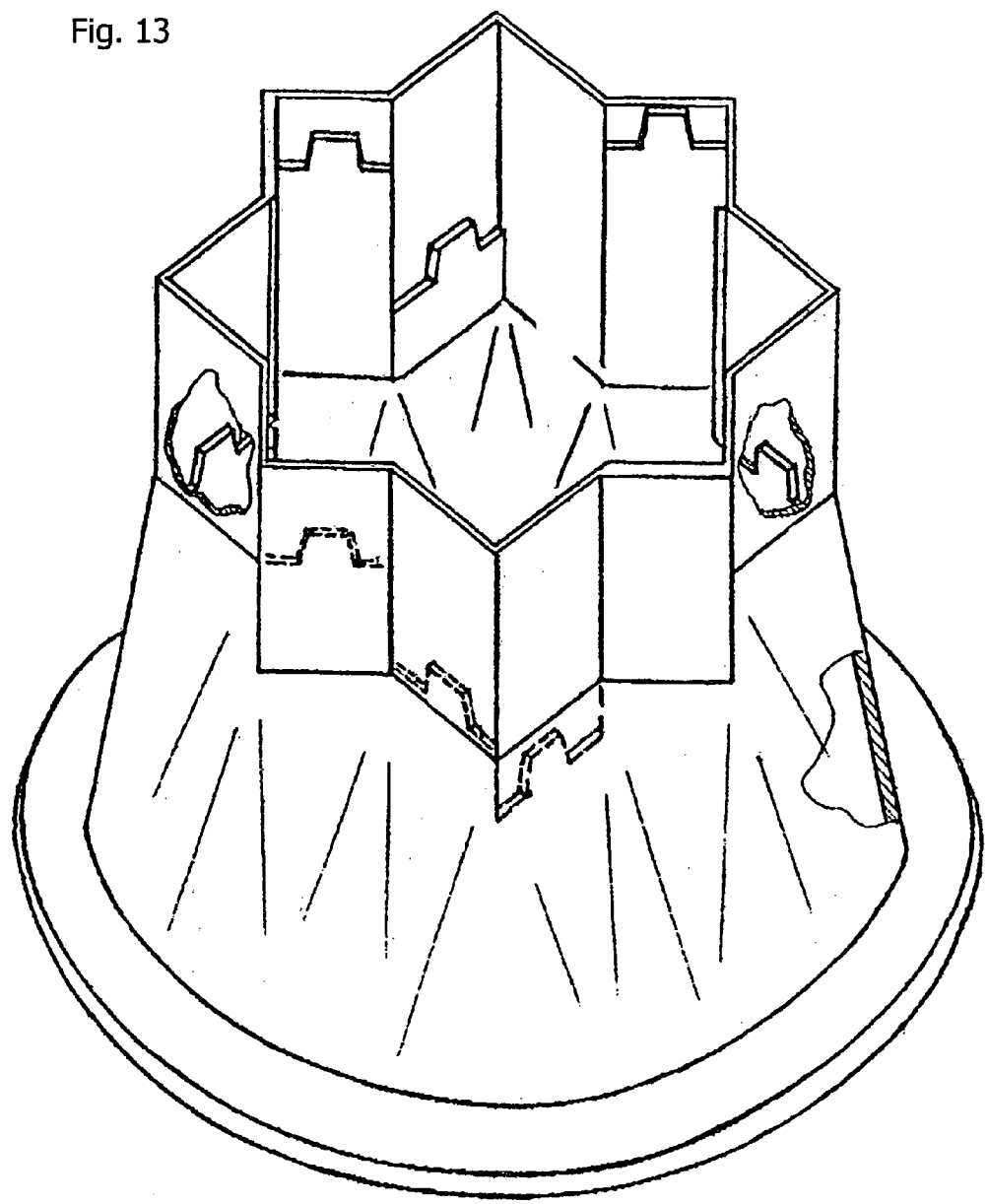
FIG. 13 is a perspective view of the base of the support apparatus of FIG. 12.
Figure 14:
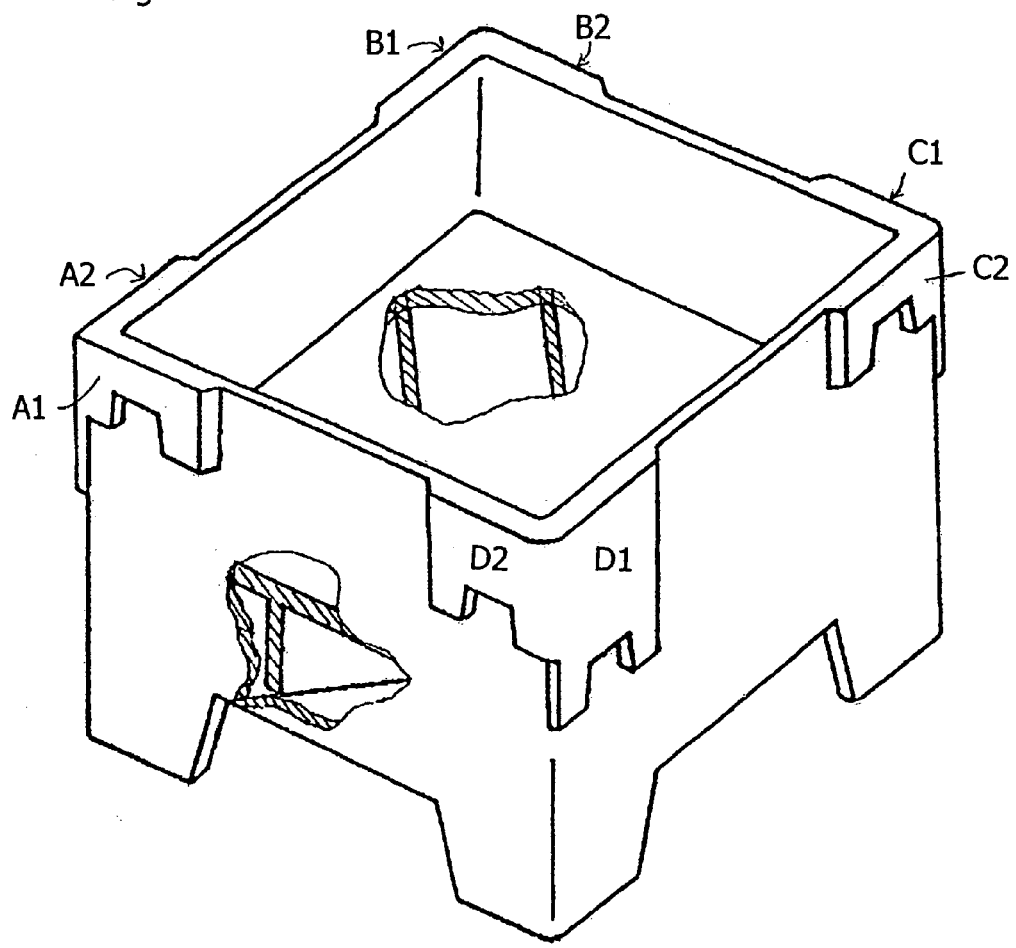
FIG. 14 is a perspective view of the cradle of the support apparatus of FIG. 12.
Figure 15A:
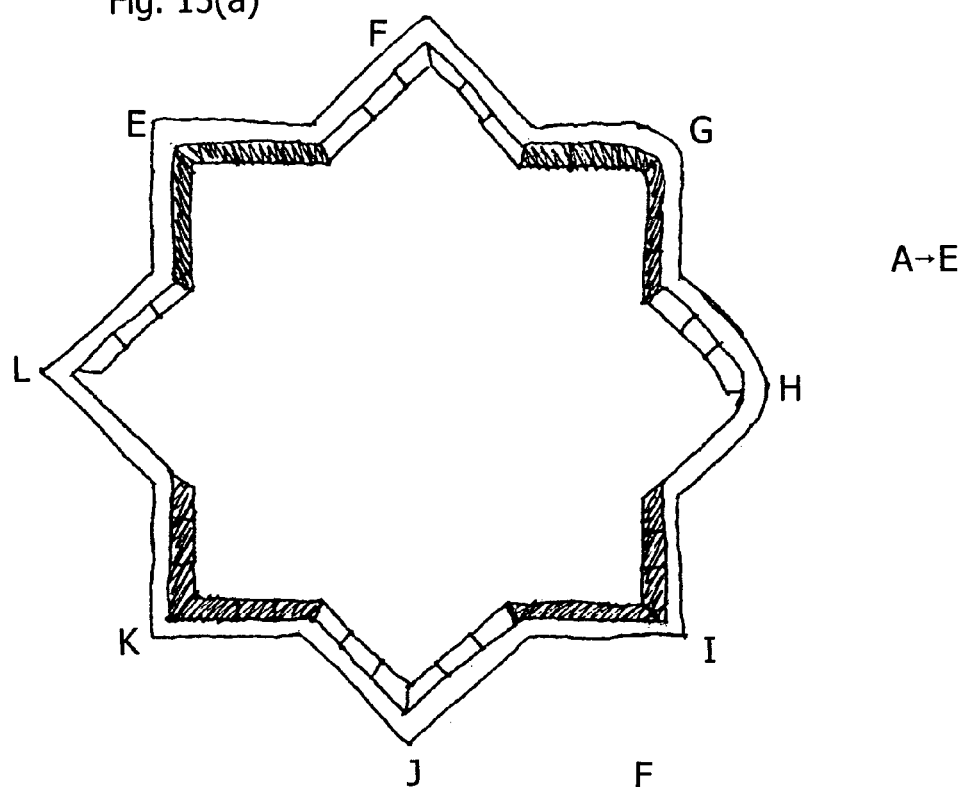
Figure 15B:
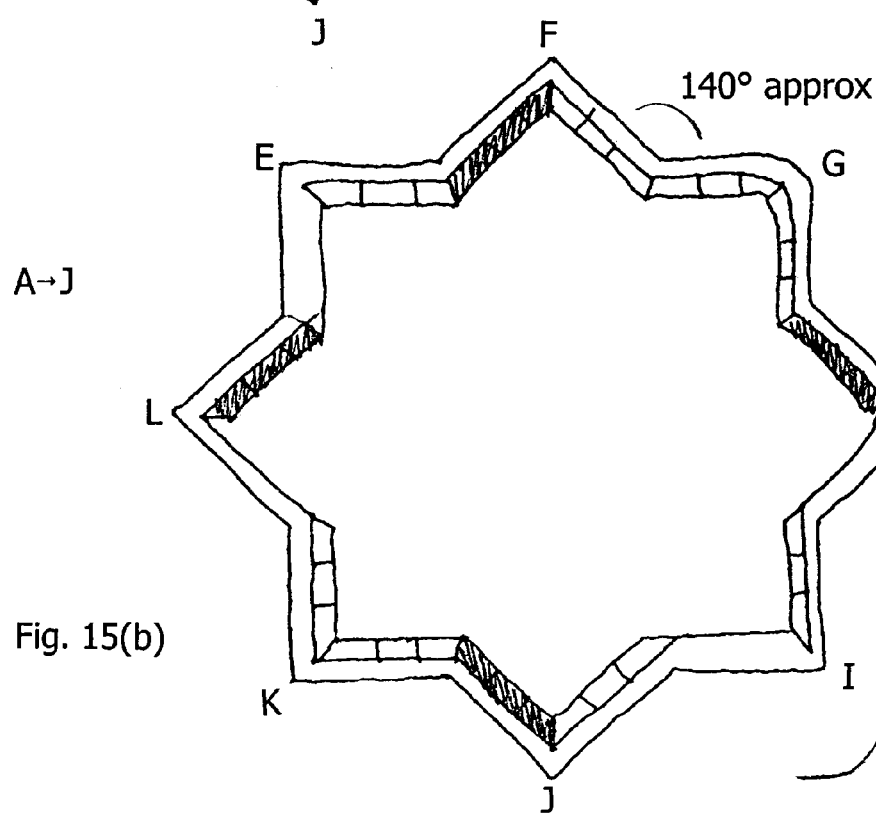
Figure 15E:
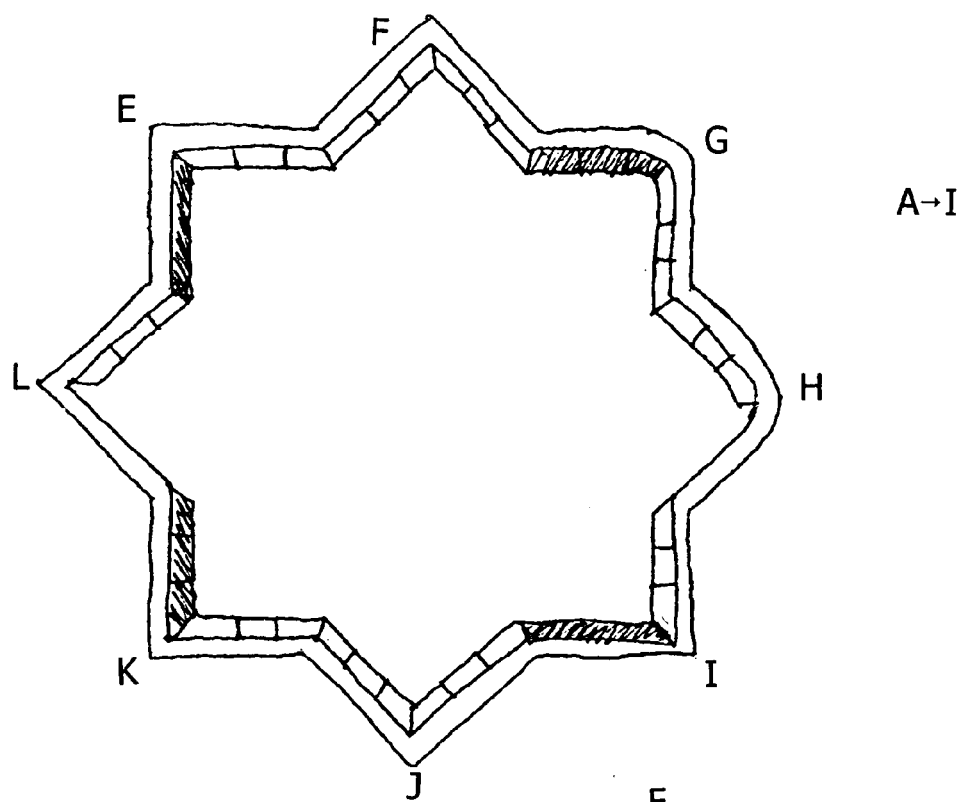
Figure 15F:
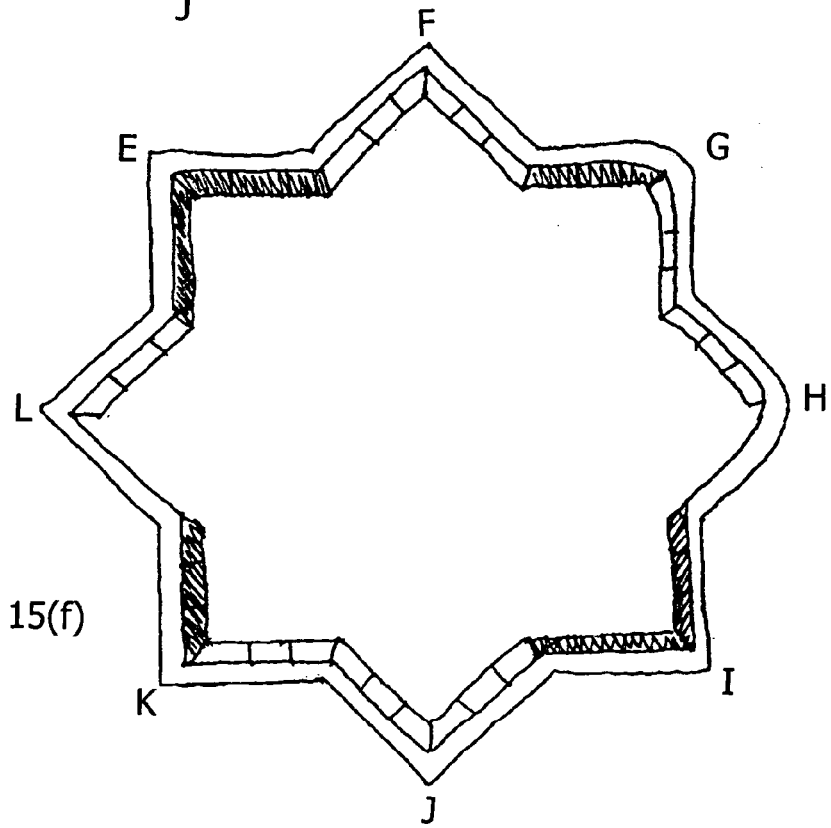

Referring now to FIGS. 12–14, an adjustable support apparatus according to a fifth embodiment of the invention is shown generally at 90, including a base 92 and a cradle 94 which fits engagingly in the base. The corners of the cradle are designated A, B, C and D, moving clockwise in the drawing.

The Base

In this fifth embodiment, the upper part 93 of the base 92 forms a decahexagon made of two square shapes superimposed at a 45 degree angle. The eight corners of the base upper part 93 are designated E, F, G, H, I, J, K and L in clockwise rotation, with different vertical walls of each corner section designated with numbers such as E1, E2, F1, F2, etc. The corners G and H are rounded with generous radii of filet (5 mm), so that it will be physically impossible to insert the sharp corner A of the cradle 94 in the rounded corner by mistake.

The inner walls have footholds as shown in the figure, except for L1 and H2 walls that have none. This enables the foot of the cradle 94 to fit engagingly on the footholds, providing support for the load of a furniture article to be placed on the horizontal partition 95 of the cradle. The height from the top edge determines how deeply the cradle 94 can be inserted into the base 92, and also determines the effective adjusted height of the apparatus 90.

The lower part makes a smooth transition from the 16-gon to the circular disc at the base thereof.

The Cradle

The cradle 94 has four corners A, B, C, and D an the corresponding side walls A1, A2, . . . D1, D2 named in clockwise rotation. The corner A is a sharp corner that prevents insertion into the rounded base corners G and H, as noted, while the other three corners B, C, D are rounded and can be inserted into the rounded base corners G and H. The height of these eight feet are arranged in such a manner that by rotating the cradle and inserting it into the base in different positions, six different effective heights of the apparatus, at regularly spaced height intervals, can be attained.

This arrangement also distributes the load symmetrically among corners, as the contact footholds are shown for various inserting configurations in the figures. For all six configurations, supports are located at all four corners of the cradle 94.

If insertion of corner A into G and H are allowed, supports will not be found at all four corners. It is possible to allow these arrangements, but the load-bearing capacity will be lessened considerably, so preventing such configurations may be preferred.

Although the present invention has been described herein with respect to a preferred embodiment thereof, the foregoing description may be intended to be illustrative, and not restrictive. Those skilled in the art will realize that many modifications of the preferred embodiment could be made which would be operable.

For example, in the above embodiments, the projections are typically provided on the cradle, while the grooves are provided with the base and the cradle is inserted into a central opening of the base, a reverse scenario could be achieved by having the cradle slide over and around the base, with recesses defined in an inner surface of the cradle and projections provided on an outer surface of the base.

Alternatively, downwardly-facing grooves could be formed in the outer surface of the cradle, and corresponding projections could be formed extending inwardly inside the base, to support the cradle thereon. All such modifications, which are within the scope of the appended claims, are intended to be within the scope and spirit of the present invention.

All such modifications, as well as equivalents thereof, which are within the scope of the appended claims, are intended to be within the scope and spirit of the present invention.

What is claimed is:

1. An adjustable support apparatus for use in elevating furniture, the apparatus comprising a base and a cradle which operatively engages the base so as to be supported thereby;
    one of the base and the cradle having a plurality of projections formed thereon, and the other of the base and the cradle having a plurality of recesses formed in a wall thereof which are configured to mate with the projections on the other of the base or cradle when the base and the cradle are operatively engaged, each of said recesses having a projection-engaging surface, said recesses being arranged such that said projections may be selectively disposed to engage the projection-engaging surfaces of different ones of the recesses depending on an alignment of said cradle and said base relative to each other;
    wherein said projections are arranged at different elevational levels along an engagement direction of said cradle and said base;
    wherein said cradle includes a support platform adapted to support a support leg of a furniture item thereon and a circumferential wall extending upwardly from peripheral edges of said support platform that is adapted to prevent said leg from sliding off said support platform;
    wherein said base and said cradle are rotatably adjustable relative to one another in different alignments, to variously engage the projections and recesses and thereby establish multiple different height positions of the cradle support platform, and in at least one of said different alignments said cradle support platform is disposed at a level significantly below an upper surface of said base.

2. The adjustable support apparatus of claim 1, wherein the cradle has a plurality of projections extending outwardly from an outer wall thereof, and the base has a plurality of recesses formed in an inner wall thereof which are configured to mate with the projections on the cradle when the base and the cradle are operatively engaged.

3. The support apparatus of claim 1, wherein said support platform and said circumferential wall of said cradle body define a cup-shaped recess.

4. The adjustable support apparatus of claim 1, wherein an outer surface of the base is tapered such that a bottom portion of the base is wider than a top portion thereof.

5. The support apparatus of claim 1, wherein said base is hollow with a central opening defined therethrough, and said cradle slidably fits in said central opening of the base.

6. The support apparatus of claim 1, wherein said support platform and said circumferential wall of said cradle define a cup-shaped recess.

7. The support apparatus of claim 1, wherein said support platform extends substantially horizontally when said cradle is operatively engaged to said base.

8. The support apparatus of claim 1, wherein the entire cradle is disposed at a level significantly below the upper surface of said base in at least one of said different alignments.

9. An adjustable support apparatus for use in elevating furniture, the apparatus comprising a base and a cradle which operatively engages the base so as to be supported thereby;
    wherein the base comprises a hollow base body having a central opening formed therein to receive the cradle, said central opening defining an inner wall of the base, said inner wall having a plurality of grooves formed therein receiving projections provided on the cradle,
    the cradle comprises a cradle body having a substantially horizontal support platform extending thereacross and a circumferential wall extending upwardly from peripheral edges of said support platform, the cradle projections extending outwardly from an outer surface of said cradle body, said projections configured to be selectively fitted into different ones of said grooves in said base inner wall depending on an alignment of said cradle and said base relative to each other, to establish different height positions of the support platform;
    wherein said projections are arranged at different elevational levels along an engagement direction of said cradle and said base;
    said cradle and said base being moveable relative to each other into different alignments of the cradle on the base to establish the different height positions of the support platform, and in at least one of said different alignments said support platform is disposed at a level significantly below an upper an upper surface of said hollow base body.

10. The support apparatus of claim 9, wherein said cradle slidably fits in said central opening of the base, and the entire cradle is disposed at a level significantly below the upper surface of said hollow base body in at least one of said different alignments.

11. The support apparatus of claim 9, wherein the grooves of the base are substantially vertically oriented.

12. The support apparatus of claim 9, wherein the grooves of the base are substantially horizontally and vertically oriented.

13. The support apparatus of claim 9, wherein said cradle body is substantially cylindrical.

14. The support apparatus of claim 9, wherein said cradle body is formed in a substantially rectangular box shape.

15. The support apparatus of claim 14, wherein said central opening of said base body is a polygon.

16. The support apparatus of claim 15, wherein said central opening of said base body is a decahexagon comprising corner portions of two square outlines superimposed at a 45 degree angle.

17. The support apparatus of claim 9, wherein the cradle has a plurality of said projections, said projections are vertically and circumferentially spaced-apart.

18. The support apparatus of claim 17, wherein the base is adapted to simultaneously support said plurality of vertically and circumferentially spaced-apart projections in said grooves thereof.

* * * * *